April 1, 1924.
A. PLOUFFE
VEHICLE LOCKING DEVICE
Filed Sept. 7, 1922
1,488,893
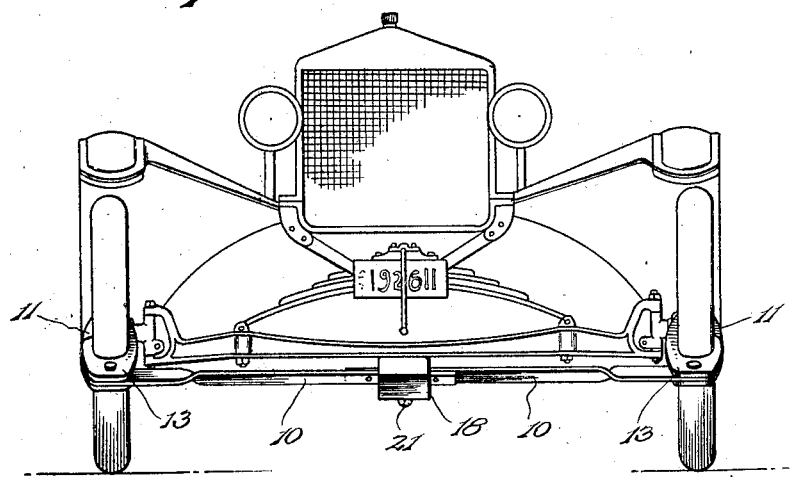
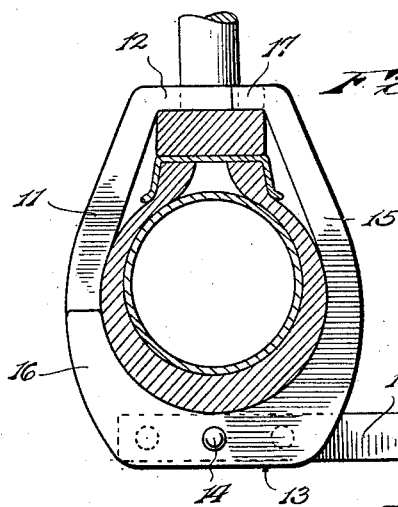
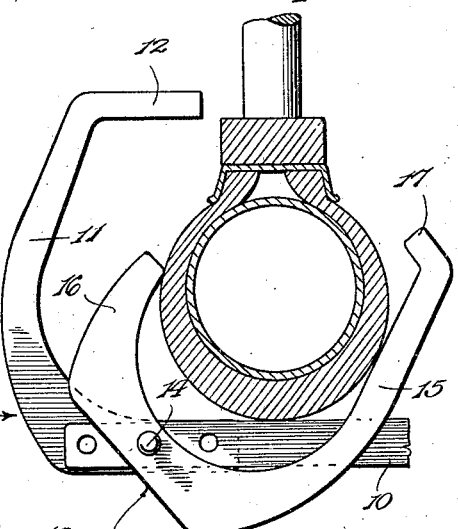
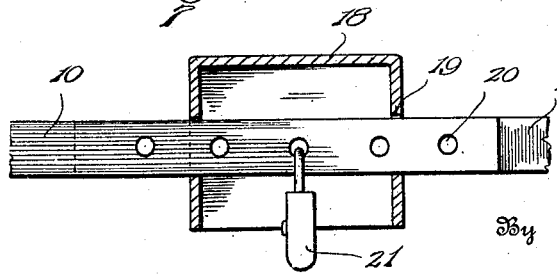
Inventor
A. Plouffe.
By Lacey & Lacey, Attorneys Patented Apr. 1, 1924.

1,488,893

UNITED STATES PATENT OFFICE.

ADILARD PLOUFFE, OF WOONSOCKET, RHODE ISLAND.

VEHICLE LOCKING DEVICE.

Application filed September 7, 1922. Serial No. 586,679.

*To all whom it may concern:*

Be it known that I, ADILARD PLOUFFE, citizen of the United States, residing at Woonsocket, in the county of Providence and State of Rhode Island, have invented certain new and useful Improvements in Vehicle Locking Devices, of which the following is a specification.

This invention relates to an improved locking device for motor vehicles and seeks, as one of its principal objects, to provide a device of this character which may be readily applied to either the front or rear wheels of a vehicle for effectually locking them so that unauthorized use or theft of the vehicle will be prevented.

A further object of the invention is to provide a device which will be formed to extend transversely between the pair of front wheels of the vehicle or between the pair of rear wheels of the vehicle and wherein a single lock will be employed for locking the device applied.

And the invention has as a still further object to provide a device which will be composed of few and simple parts, may accordingly be produced at moderate cost, and will be adapted for use in connection with vehicles of different makes.

Other and incidental objects will appear hereinafter.

In the drawings:

Figure 1 is an elevation showing my improved device applied to the front wheels of a conventional motor vehicle, Figure 2 is a fragmentary plan view showing one pair of the wheel engaging jaws of the device closed, the wheel felly, rim and tire being shown in section, Figure 3 is a view similar to Figure 2 showing the wheel engaging jaws open, and Figure 4 is a fragmentary section particularly showing the coupling box of the device.

In carrying the invention into effect, I employ companion body bars 10 and secured to the lower sides of said bars at their outer ends are longitudinally bowed stationary jaws 11 provided with terminal laterally directed lugs 12. Mounted to swing upon the outer ends of the bars 10 at their upper sides are coacting substantially U-shaped jaws 13 pivotally connected to said bars by rivets or other suitable fastening devices 14. The jaws 13 are provided with long arms 15 and with short arms 16, the arms 15 being bowed longitudinally and provided with terminal laterally directed lugs 17. As shown in Figure 2, the jaws 13 are movable to closed position overlying the jaws 11 in registering relation. Slidably connecting the body bars 10 is a coupling member or box 18 open at its lower side and formed in the end walls of the box are slots 19 freely receiving the inner end portions of the bars therethrough. At their inner end portions, these bars are each provided with a series of spaced openings 20 and by shifting the bars endwise one of the openings in one bar may be brought into register with one of the openings of the other bar to receive the shackle of a padlock conventionally illustrated at 21.

In order to clearly bring out the manner in which my improved locking device is employed in practical use, I have, in Figure 1 of the drawings, shown the device applied to the front wheels of a conventional motor vehicle. Initially, the jaws 13 are, as shown in Figure 3, swung open, when the body bars 10 are shifted outwardly to position the stationary jaws 11 at the outer sides of the wheels so that the wheel tires are received between the jaws 11 and the movable jaws 13, the body bars resting against the tire treads. Accordingly, the short arms 16 of the jaws 13 will be brought into engagement with the sides of the tires at the outer sides of the wheels so that by drawing the body bars inwardly upon each other, the short arms of the jaws 13 will be caused to coact with the wheel tires for rocking said jaws to closed position extending about the tires at the inner sides of the wheels while the stationary jaws 11 will be moved to abut the tires at the outer sides of the wheels, each pair of jaws mating and having the lugs 12 and 17 thereof overlapping at the inner face of one of the wheel fellies respectively. The body bars 10 are then adjusted to tension the jaws in engagement with the wheels and to bring one of the openings 20 in each bar in registering relation when the lock 21 is engaged through said registering openings to secure the body bars against endwise movement. Accordingly, the device will be securely fastened upon the vehicle wheels so that the vehicle cannot travel either forwardly or backwardly while the jaws of the device will grip the tires of the wheels coacting with the wheel fellies for locking the wheels against swinging movement and thus prevent the vehicle from being guided. As will now be seen, the device may be applied either to the front wheels of the vehicle or to the rear wheels thereof while by providing each of the body bars of the device with a number of spaced openings, the devices may be adjusted to suit the requirements of different vehicles. The coupling box 18 will, of course, rigidly hold the body bars against angular movement with respect to each other and will provide a housing for the lock 21 protecting the lock from the weather. When not in use, the lock may, of course, be carried within the vehicle.

Having thus described the invention, what is claimed as new is:

1. A vehicle locking device including relatively slidable companion body bars to extend between a pair of vehicle wheels and provided with jaws to engage under the wheel fellies, means locking the bars together to hold the jaws against displacement, and means slidably mounted on the bars and housing the locking means.

2. A vehicle locking device including relatively slidable companion body bars to extend between a pair of vehicle wheels and provided with jaws to engage under the wheel fellies, a lock securing the bars together holding the jaws against displacement, and a coupling box slidably connecting the bars and housing said lock.

3. A vehicle locking device including companion body bars to extend between a pair of vehicle wheels and provided at their outer ends with rigid jaws to engage under the wheel fellies and tires at the outer sides of the wheels, coacting jaws pivoted upon the bars to engage under the wheel fellies and tires at the inner sides of the wheels, and having portions engaging against the outer sides of the tires whereby inward movement of the bars will swing the pivoted jaws into locking engagement with the wheels, and means locking the bars together to hold said jaws against disengagement from the wheels.

4. A wheel-locking device including companion bars, jaws rigid with the outer ends of the respective bars and projecting laterally therefrom to embrace the outer side of a wheel tire and felly with the bar extending across the tire, coacting jaws pivoted on the bars at the outer ends thereof to embrace the inner sides of wheel tires and fellies and partly embrace the outer side of the tire, and means for locking the inner ends of the bars together whereby to hold the jaws against release.

5. A wheel-locking device including companion bars, jaws rigid with the outer ends of the bars and constructed to engage the outer side of a wheel tire and felly, coacting jaws pivoted on the bars at the outer ends thereof and having a long arm to engage the inner side of a wheel tire and felly and a short arm to lie beside the base of the rigid jaw and engage a portion of the outer side of the tire, and means for locking the bars together whereby to hold the jaws against release.

In testimony whereof I affix my signature.

ADILARD PLOUFFE. [L. S.]

In presence of—
   Aristide Dubois,
   Ovila E. Proulx.